United States Patent [19]
McGehee

[11] 3,929,048
[45] Dec. 30, 1975

[54] RECIPROCATING GANG SAW

[76] Inventor: John W. McGehee, 3450 N. State St., Ukiah, Calif. 95482

[22] Filed: Nov. 11, 1974

[21] Appl. No.: 522,546

[52] U.S. Cl. .................. 83/751; 83/425.2; 83/427; 83/778; 83/784
[51] Int. Cl.² ............................................ B27B 3/00
[58] Field of Search ............ 83/751, 778, 777, 776, 83/784, 783, 425.2, 425.3, 427, 404.4

[56] References Cited
UNITED STATES PATENTS

| | | | |
|---|---|---|---|
| 1,999,449 | 4/1935 | Erickson | 83/751 |
| 2,115,102 | 4/1938 | Gottfried et al. | 83/427 |
| 2,619,130 | 11/1952 | Nielsen | 83/778 |

FOREIGN PATENTS OR APPLICATIONS

| | | | |
|---|---|---|---|
| 1,907,412 | 3/1970 | Germany | 83/784 |

*Primary Examiner*—J. M. Meister

[57] ABSTRACT

A reciprocating gang saw in which each elongated saw blade of a horizontally extending row or gang of parallel, vertically extending such blades is connected at its upper and lower ends with respective upper and lower crank shafts. The crank shafts are supported for rotation about axes extending respectively along the upper and lower ends of the blades. Each shaft has a plurality of cranks that are offset with respect to each other so that the blades successively engage and cut material fed past them at different intervals.

4 Claims, 6 Drawing Figures

RECIPROCATING GANG SAW

BACKGROUND

Heretofore, where reciprocating saws or blades of a gang have been employed for sawing pieces of wood such as planks or "cants" into strips or sections such as dimensioned lumber, it has been customary to connect one of the ends of the blades with cranks or eccentrics offset to one side of a rotatable shaft for simultaneous, intermittent engagement of the lumber with all of the saws at the commencement of each cutting stroke. In some instances the gangs have been positioned one behind the other, tandem-like, so the cutting by the saws of one gang will alternate with the saws of the other. In either case the vibration caused by all the blades moving in the same cycle was so severe that the movement of the gangs was reduced to a very slow speed to reduce the vibration to fairly tolerable limits. The output of the machine was correspondingly reduced.

SUMMARY

In this invention the eccentric cranks of the saw blade driving shafts are offset for each blade from the other so that the blades oscillate in different cycles. Preferably the cranks are distributed at equally spaced intervals around the circumference of a circle having the axis of rotation of the crank shaft as its center.

One of the objects of this invention is the provision of gang saw of the reciprocating-saw type in which objectionable vibration is eliminated and the efficiency of production of cut material is greatly increased.

Another object of the invention is the provision of a gang saw in which opposite ends of a plurality of vertically extending saw blades in a horizontally extending row are connected with cranks for successive movement of the individual blades of the row into cutting engagement with the material to be cut during each of a plurality of fractional movements of the cranks in their circular paths.

A still further object of the invention is the provision of a plurality of saw blades of equal lengths in spaced side by side relation in a row, and with said blades connected with parallel shafts for corresponding cyclic movement in the same direction, and with said blades connected with said shafts for successive movement of the blades of the row into cutting engagement with material fed therepast during each fraction of said cyclic movement that the number of saws bears to one.

Other objects and advantages will appear in the description and drawings.

DESCRIPTION OF DRAWINGS

FIGS. 5, 6 show part of a blade.

DETAILED DESCRIPTION

Figure 1:
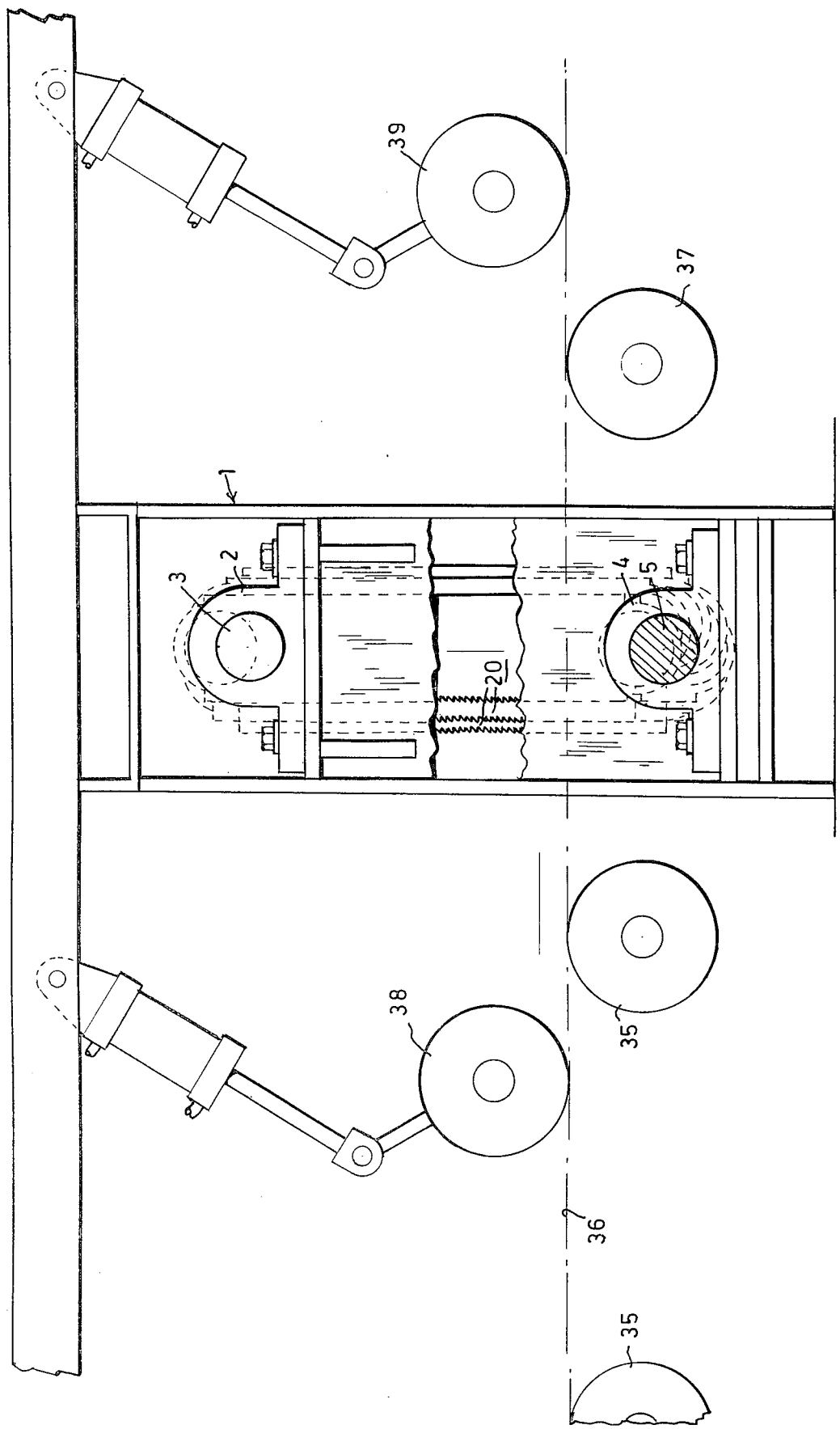
FIG. 1 is a simplified side elevational view of a gang saw embodying this invention with a side support broken away and the power-driven shaft in cross section.
Figure 2:
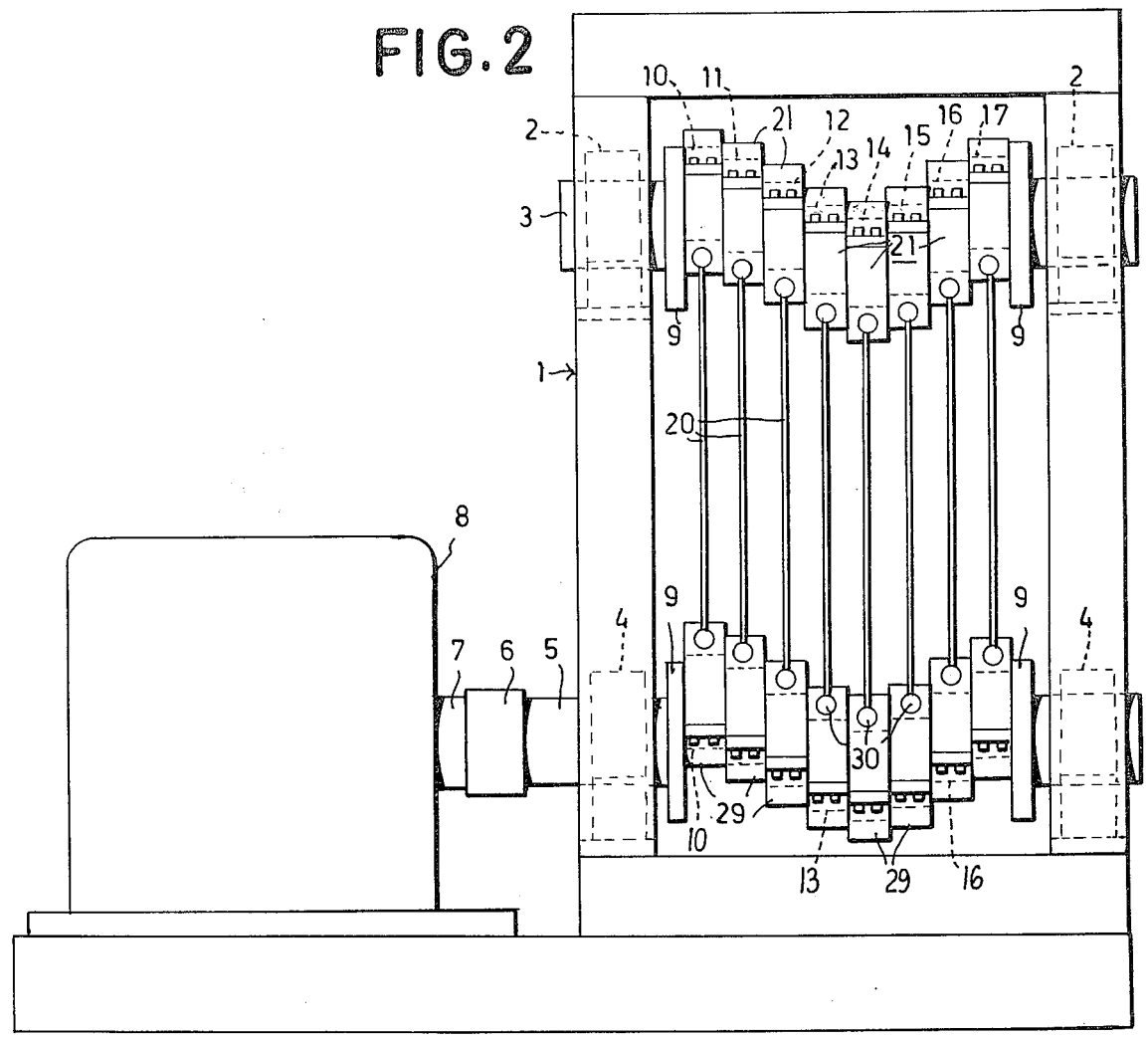
FIG. 2 is a simplified elevational view of the gang saw at a right angle to the view in FIG. 1.

The gang saw of FIGS. 1, 2 comprises a frame, generally designated 1, which frame has a pair of upper bearings 2 in which the ends of an upper horizontal crank shaft 3 are journalled for rotation. Similar bearings 4 on frame 1 are spaced below bearings 2 and support the ends of a lower crank shaft 5 for rotation about an axis that is parallel with the axis of rotation of shaft 3.

Crank shafts 3, 5 are identical except that shaft 5 is slightly longer than shaft 3 for connecting it by a coupling 6 with the drive shaft 7 of a motor 8, hence a detailed description of crank shaft 3 will apply to shaft 5 and the same numbers will apply.

Figure 4:
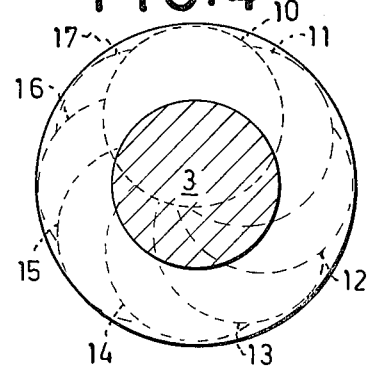
FIG. 4 is an end view of the crank shaft of FIG. 3 with the positions of the cranks indicated in broken lines.
Figure 3:
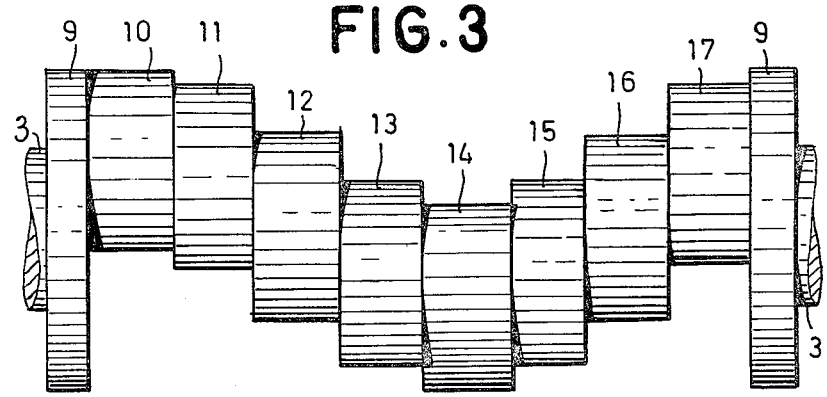
FIG. 3 is an enlarged elevational view of one crank shaft of the pair of FIG. 1 with the ends broken off.

Shafts 3, 5 are each formed with a radially outwardly projecting flange 9 at each of their ends and the portion of each shaft between the flanges is formed with adjacent cranks 10, 11, 12, 13, 14, 15, 16, 17. The individual cranks on each shaft are formed about parallel axes equally spaced from each other and equally spaced from the axis of the shaft (FIGS. 3, 4).

Eight saw blades 20 are provided, each being of the same length and shape with cutting edges along one of its longitudinally extending edges (FIG. 1). Said blades are vertical and each is connected at its upper end with one of bearings 21 (FIG. 2) that, in turn, is rotatably on each of the cranks 10–17 with the flat sides of the blades in oppositely facing relation and the cutting teeth facing the same direction.

Bearings 29 at the lower ends of blades 20 similarly connect the blades with cranks 10–17 of the lower shaft 5. Each of the cranks 10–17 is correspondingly offset the same relative to the axes of the shafts 3, 5, and upon rotation of shaft 5 in a counter-clockwise direction (FIGS. 1, 4), the upper and lower ends of the blades will have the same cyclic movement with the blades moving downwardly longitudinally thereof at one side of the axes of shafts 3, 5 and upwardly at the other side.

Figure 5:
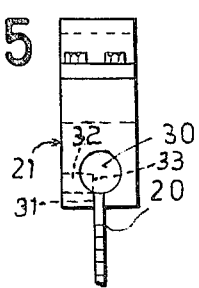
FIG. 5 is a detailed end elevational view of one of the elements for connecting one of the blades with the crank shafts.
Figure 6:
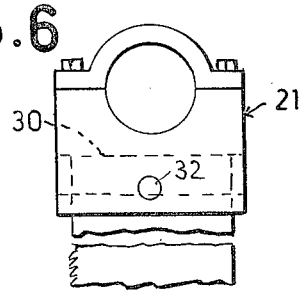
FIG. 6 is a side elevational view of the element of FIG. 5 as seen at a right angle to the latter. Both

While the blades may be secured to bearings 21, 29 in any suitable manner, enlargements 30 (FIGS. 5, 6) may be ridgidly connected with the blades at their ends, which enlargements may be removably fitted in complementarily formed recesses in bearings 21, 29 that extend at right angles to shafts 3, 5 with one side of each recess being slotted at 31 to pass the blade (FIG. 5). A pin 32 (FIGS. 5, 6) may be inserted into a recess formed in a side of each bearing 21 and 29 and into a notch 33 in the side of each enlargement 30, and spot welded in place, to securely hold each saw in the bearing, until replacement is desired.

A flat, elongated piece of material, such as a cant, to be cut may be supported for movement to and past the gang saw in the conventional manner, such as by power driven infeed rollers 35 (FIG. 1) supporting the cant for movement along the infeed base line 36 to the outfeed rollers 37. Infeed hold-down rollers 38 and outfeed hold-down rollers 39 supported above line 36 are yieldably urged downwardly by air cylinders and serve to hold the cant and cut lumber against rollers 35, 36 during such movement.

The cant may be moved to and past the gang saw illustrated at the rate of approximately 100 feet per minute, while the motor 8 is rotating the cranks 3, 5 at approximately 1200 to 1700 R.P.M. The movement of the cranks in FIG. 1 is counterclockwise. During this operation the saws 20 successively come into cutting engagement with the cant upon each 45 degrees of the cyclic movement of the blades of the gang instead of the simultaneous engagement heretofore effected. The previously encountered objectionable vibration is accordingly eliminated and the cutting efficiency from the standpoint of volume is greatly increased.

While eight blades having cranks offset at intervals of 45 degrees have been described it is clear that other numbers of blades and offset spacing may be employed. It will also be understood that, although equal spacing of the cranks around the shafts is preferable, other means of balancing the dynamic movement of the saw blades and their bearings are intended to be within the spirit and scope of the appended claims.

I claim:

1. In a gang saw that includes a row of elongated saw that includes a row of elongated saw blades in parallel, spaced relation having cutting teeth along one of their longitudinally extending edges, which teeth face the same direction for sawing engagement with the material to be cut thereby, the improvement comprising:
    a. blade supporting means rotatable about parallel axes respectively extending along the opposite ends of said row rotatably connected with the ends of each of said blades at one of a plurality of points spaced from said respective axes and from each other for movement of said ends and said blades in annular paths in parallel planes with the ends of each blade offset from the others around said axes for successive sawing engagement of said blades with material fed thereto and therepast upon rotation of said blade supporting means in one direction,
    b. means for supporting material to be cut to and past said cutting teeth during said rotation of said blade supporting means, and
    c. power means connected with one of said blade supporting means for rotating it about its axis for successively moving the blades of said row into cutting engagement with material fed to and past said cutting teeth.

2. The gang saw of claim 1, in which:
    c. said spacing of said points being equal from said axes and from each other whereby a plurality of said blades will be in cutting engagement with said material during rotation of said blade supporting means.

3. The gang saw of claim 1, in which:
    c. said blade supporting means comprises a pair of parallel shafts each formed intermediate its ends with a plurality of adjacent cranks, each being at one of said points.

4. In the gang saw of claim 3, said blade supporting means including:
    d. a rigid frame having stationary bearings supporting said shafts spaced one above the other, and
    e. said power means being an electric motor directly connected with the lower shaft of said pair.

* * * * *